United States Patent
Yeh

(10) Patent No.: US 8,249,803 B2
(45) Date of Patent: Aug. 21, 2012

(54) MOBILE ELECTRONIC DEVICE PROVIDING DISPLAY BACKGROUND ROTATION AND METHOD THEREOF

(75) Inventor: Wang-Hung Yeh, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 458 days.

(21) Appl. No.: 12/568,790

(22) Filed: Sep. 29, 2009

(65) Prior Publication Data

US 2010/0274484 A1 Oct. 28, 2010

(30) Foreign Application Priority Data

Apr. 28, 2009 (CN) .......................... 2009 1 0301929

(51) Int. Cl.
*G01C 21/00* (2006.01)

(52) U.S. Cl. ...................... 701/408; 701/468; 348/231.2

(58) Field of Classification Search .................. 701/408, 701/468, FOR. 107; 348/231.2, 231.3, 207.1, 348/552, 333.02
See application file for complete search history.

(56) References Cited

U.S. PATENT DOCUMENTS

| | | | |
|---|---|---|---|
| 6,657,661 B1 * | 12/2003 | Cazier | 348/231.2 |
| 7,417,672 B2 * | 8/2008 | Nakajima et al. | 348/231.3 |
| 2009/0013241 A1 * | 1/2009 | Kaminaga | 715/203 |
| 2009/0177374 A1 * | 7/2009 | Liu | 701/200 |
| 2010/0149348 A1 * | 6/2010 | Hashimoto et al. | 348/207.1 |
| 2011/0288770 A1 * | 11/2011 | Greasby | 701/208 |
| 2011/0298815 A1 * | 12/2011 | Sampsell | 345/553 |

* cited by examiner

*Primary Examiner* — Drew Brown
(74) *Attorney, Agent, or Firm* — Altis Law Group, Inc.

(57) ABSTRACT

An electronic device allowing changing of a display background thereof obtains a current location from a navigation device. An image associated with the current location is sought in a memory system, in response to a determination that the current location does not match a location associated with the current display background displayed on a display device. The current display background is replaced with the located image.

14 Claims, 3 Drawing Sheets

MOBILE ELECTRONIC DEVICE PROVIDING DISPLAY BACKGROUND ROTATION AND METHOD THEREOF

BACKGROUND

1. Technical Field

Embodiments of the present disclosure are related to electronic device management systems and methods, and particularly to a device providing display background rotation and a method thereof.

2. Description of Related Art

Since mobile electronic devices are often used as personal organizers, they frequently offer personalization capability, such as providing a display background program. For practical purposes, the display background program may provide a function that changes the display background of a mobile electronic device periodically. For example, if the mobile electronic device includes two images A and B, the display background program may rotate image A as a display background in the daytime, and image B as the display background at night. However, to rotate the display background according to other parameters of the mobile electronic device, the change must be made manually, such as, for example, to display an image captured in New York when the user is in New York.

Therefore, there is a need for a device and method to overcome the described limitations.

DETAILED DESCRIPTION

All of the processes described herein may be embodied in, and fully automated via, function modules executed by one or more general purpose processors of a mobile electronic device. Some or all of the methods may alternatively be embodied in specialized hardware. The function modules may be stored in any type of computer-readable medium or other computer storage device.

Figure 1:
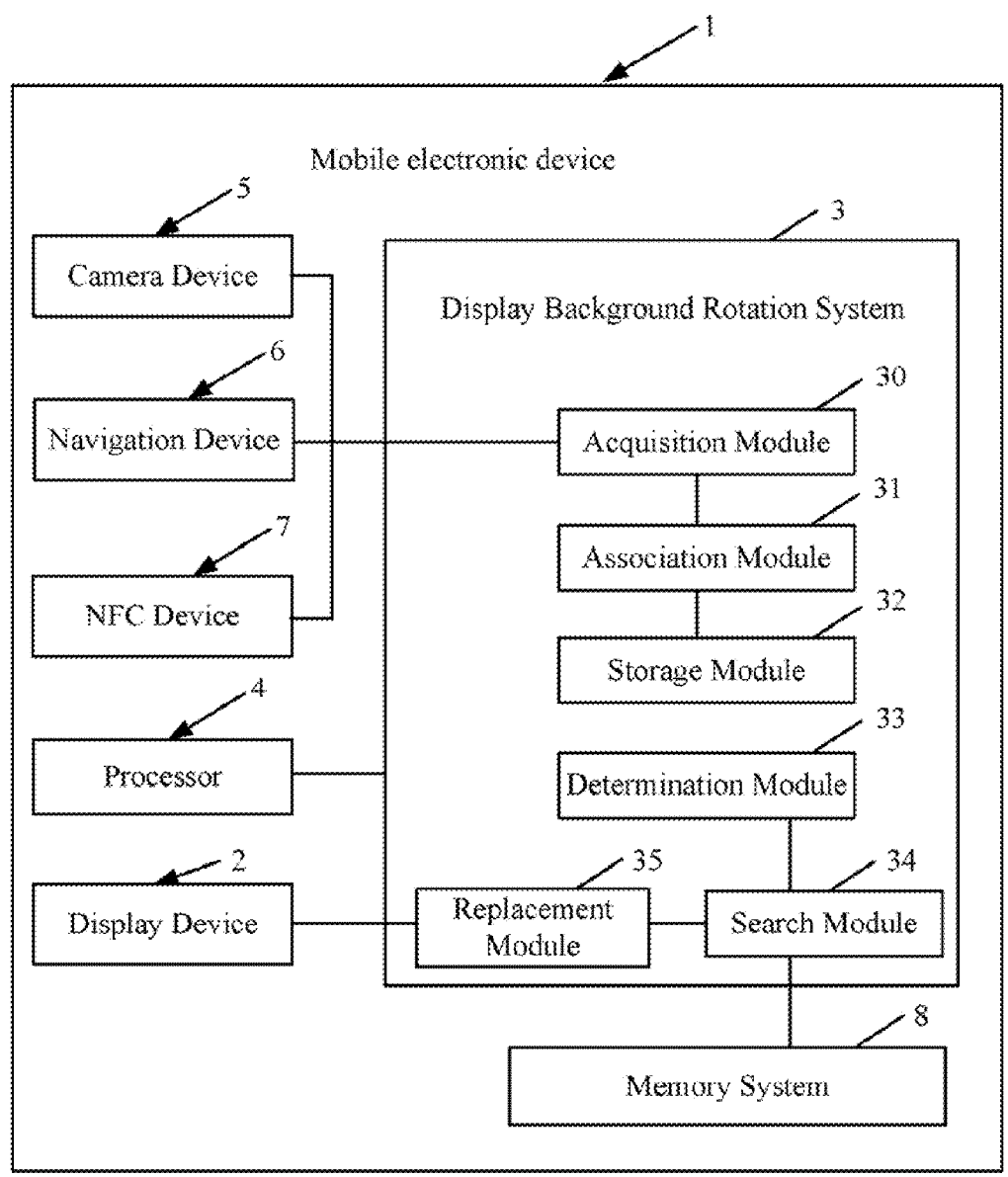
FIG. 1 is a block diagram of one embodiment of a mobile electronic device 1 comprising a system for rotating the display background.

FIG. 1 is a block diagram of one embodiment of a mobile electronic device 1 comprising a display background rotation system 3. The display background rotation system 3 may be used to vary the display background on a display device 2 of the mobile electronic device 1 according to a location of the mobile electronic device 1. In one embodiment, the mobile electronic device 1 includes a display device 2, a camera device 5, a navigation device 6, a near field communication (NFC) device 7, and a memory system 8. The camera device 5 may be used to capture one or more images, such as an image of the Statue of Liberty in New York. The NFC device 7 enables the exchange of data between the mobile electronic device 1 and any other electronic device (e.g., a digital camera, a mobile phone, or a personal computer). The navigation device 6 receives global positioning system (GPS) signals from one or more satellites, and determines the location of the mobile electronic device 1 accordingly. In one embodiment, the navigation device 6 may be, but is not limited to, an assisted GPS (A-GPS) device, or a GPS ONE device.

The memory system 8 stores one or more images. Each of the one or more images may be associated with a corresponding location of the mobile electronic device 1. In one embodiment, the memory system 12 may be an internal memory system card or an external memory system card, such as a smart media card (SMC), a secure digital card (SDC), a compact flash card (CFC), a multi media card (MMC), a memory system stick (MS), an extreme digital card (XDC), or a trans flash card (TFC). Depending on the embodiment, the mobile electronic device 1 may be a mobile phone, a personal digital assistant (PDA), a handheld game player, a digital camera, or any other portable electronic device.

In one embodiment, the display background rotation system 3 includes an acquisition module 30, an association module 31, a storage module 32, a determination module 33, a search module 34, and a replacement module 35. One or more computerized codes of the modules 30-35 are stored in the memory system 8. One or more general purpose or specialized processors, such as a processor 4 executes the one or more computerized codes of the modules 30-35 to provide one or more operations of the mobile electronic device 1.

The acquisition module 30 obtains the location of the mobile electronic device 1 from the navigation device 6, and obtains an image from the camera device 5 or the NFC device 7. In one embodiment, the location comprises longitude and latitude information of the mobile electronic device 1. The image may be captured by the camera device 5 or received from other electronic devices (e.g., a digital camera, a mobile phone, or a personal computer) using the NFC device 7.

The association module 31 associates the location of the mobile electronic device 1 with the image. In one embodiment, for example, if the name of the image is "001," and the location of the mobile electronic device 1 is (114°6'E, 22°12'N), then the association module 31 associates the name of the image "001" with the location (114°6'E, 22°12'N).

The storage module 32 stores the image having the associated location into the memory system 8.

The determination module 33 determines if a current location of the mobile electronic device 1 matches the location associated with a current display background displayed on the display device 2.

The search module 34 seeks an image associated with the current location in the memory system 8, in response to a determination that the current location of the mobile electronic device 1 does not match the location associated with the current display background.

The determination module 33 further determines if an image associated with the current location exists in the memory system 8.

The replacement module 35 replaces the current display background with the image associated with the current location, in response to a determination that an image associated with the current location exists in the memory system 8.

Figure 2:
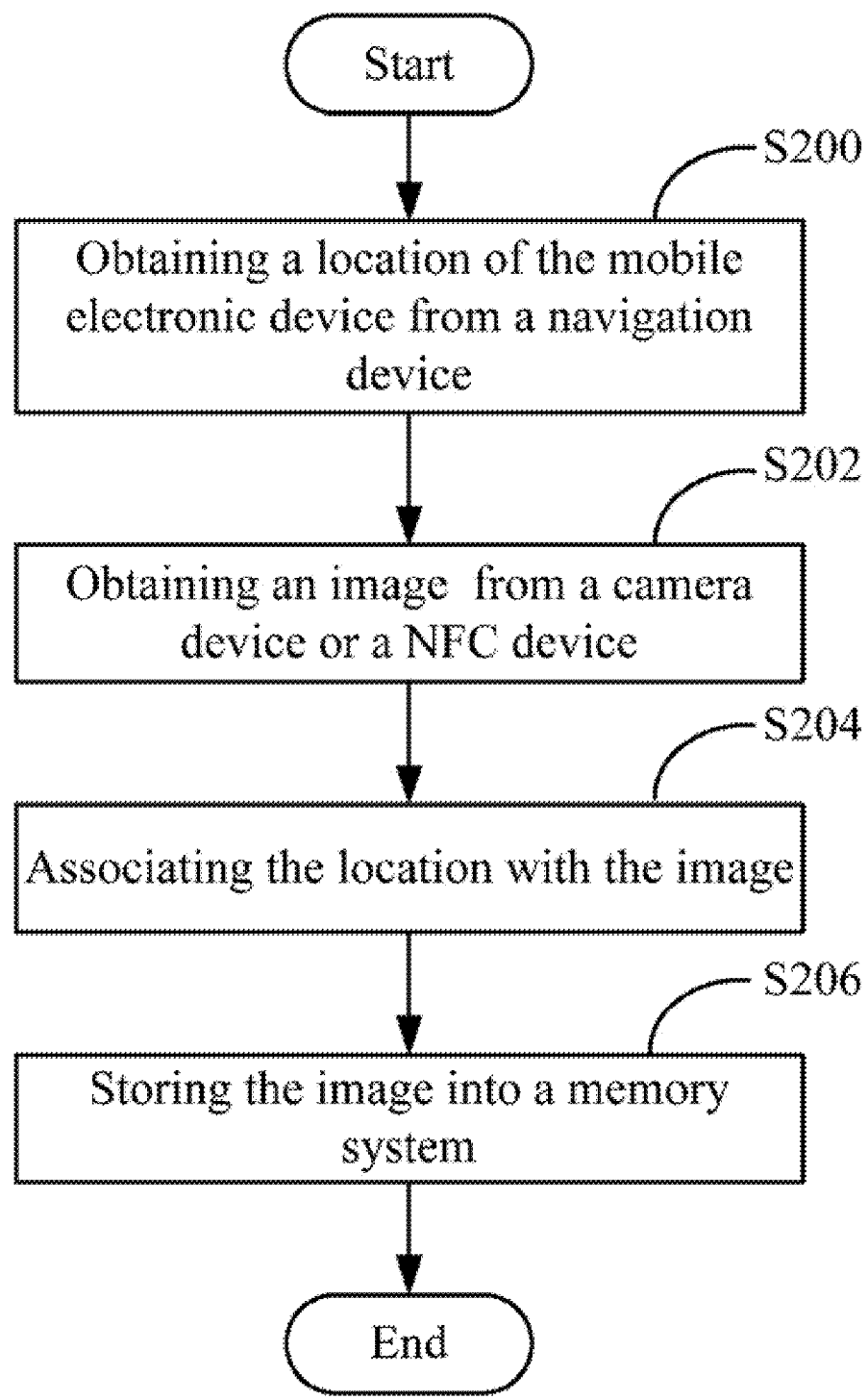
FIG. 2 is a flowchart of acquisition of an image associated with a location of the mobile electronic device in FIG. 1.

FIG. 2 is a flowchart of acquisition of an image associated with a location of the mobile electronic device in FIG. 1. Depending on the embodiment, additional blocks may be added, while others deleted, and the blocks may also be executed in a different order than described.

In block S200, the acquisition module 30 obtains location of the mobile electronic device 1 from the navigation device 6. As mentioned, the location comprises longitude and latitude information of the mobile electronic device 1.

In block S202, the acquisition module 30 further obtains an image from the camera device 5 or a NFC device 7. As mentioned, the image is captured by the camera device 5 or received from other electronic devices (e.g., a digital camera, a mobile phone, a personal computer) using the NFC device 7.

In block S204, the association module 31 associates the location of the mobile electronic device 1 to the image. For example, if the image is captured at (114°6'E, 22°12'N), then the association module 31 associates the longitude and the latitude information (114°6'E, 22°12'N) with the image.

In block S206, the storage module 32 stores the image having the associated location into the memory system 8.

Figure 3:
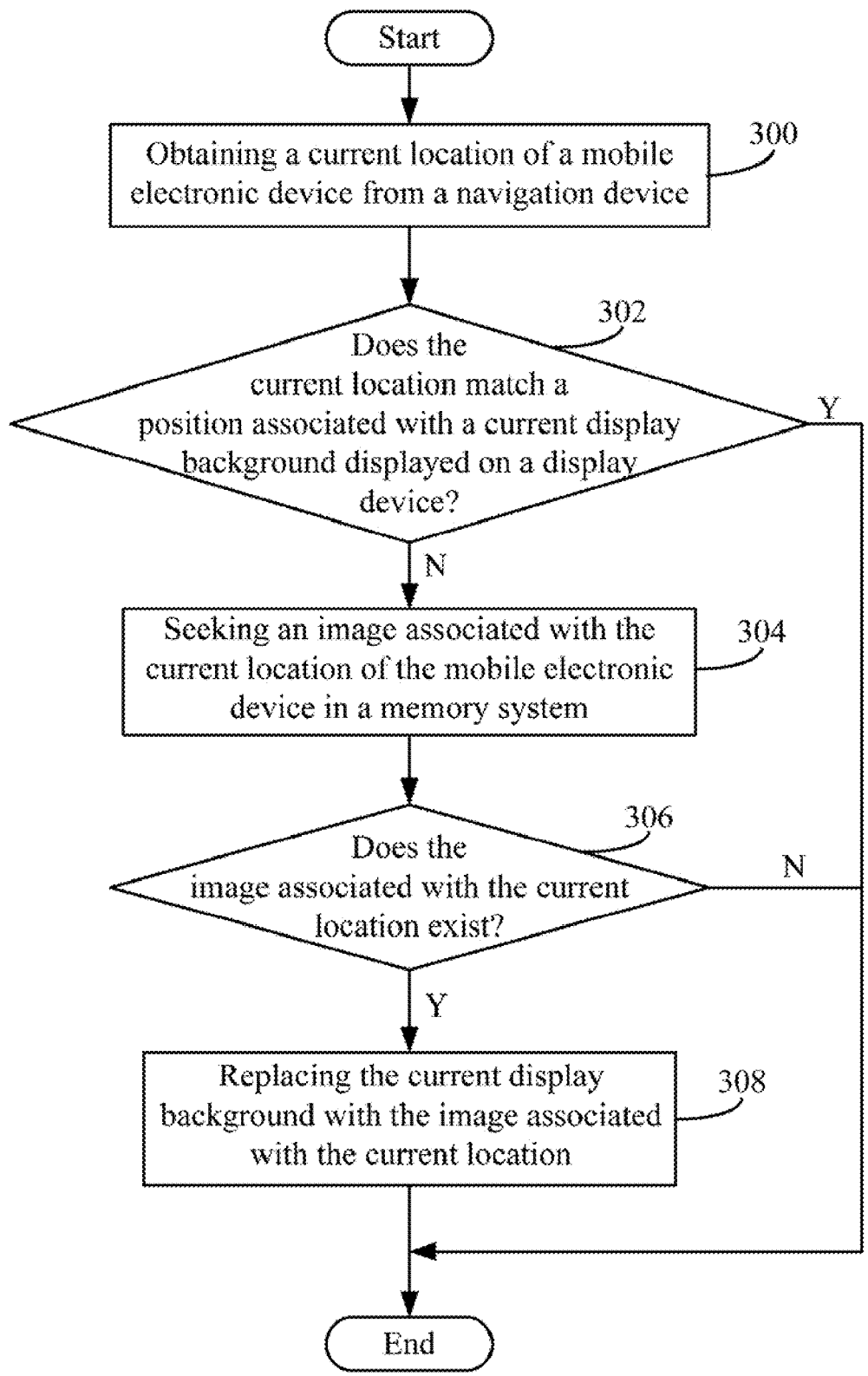
FIG. 3 is a flowchart of one embodiment of a method for rotating the display background on a mobile electronic device, such as, for example, that of FIG. 1.

FIG. 3 is a flowchart of one embodiment of a method for rotating the display background on a mobile electronic device, such as, for example, that of FIG. 1.

In block S300, the acquisition module 30 obtains a current location of the mobile electronic device 1 from the navigation device 6, such as (114°6'E, 22°12'N).

In block S302, the determination module 33 determines if the current location of the mobile electronic device 1 matches a location associated with a current display background displayed on the display device 2. If not, block S304 is implemented. If the current display background matches the current location, the procedure ends.

In block S304, if, for example, the current location of the mobile electronic device 1 is, as mentioned, (114°6'E, 22°12'N) a Hong Kong location, and the current display background is the Statue of Liberty in New York, the search module 34 seeks an image associated with the current location in the memory system 8. In one embodiment, the search module 34 seeks the current location in the memory system 8. According to the example, the search module 34 attempts to locate an image of Hong Kong in the memory system 8.

In block S306, the determination module 33 further determines if an image associated with the current location exists in the memory system 8. As mentioned, if the image associated with the current location exists in the memory system 8, block S308 is implemented. Otherwise, the procedure ends.

In block S308, the replacement module 35 replaces the current display background with the image associated with the current location.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile electronic device, comprising:
 a camera device capturing images and storing one or more images in a memory system;
 a near field communication (NFC) device receiving one or more images to the mobile electronic device from other electronic devices;
 the memory system storing a plurality of programs and the one or more images, each of the one or more images associated with at least one corresponding location; and
 a processor executing one or more operations for the plurality of programs, the programs comprising:
 an acquisition module operable to obtain a current location of the mobile electronic device from a navigation device;
 a determination module operable to determine if the current location of the mobile electronic device matches a location associated with a current display background displayed on a display device of the mobile electronic device;
 a search module operable to seek an image associated with the current location of the mobile electronic device in the memory system, in response to a determination that the current location of the mobile electronic device does not match the location associated with the current display background;
 the determination module further operable to determine if an image associated with the current location exists in the memory system; and
 a replacement module operable to replace the current display background with the image associated with the current location, in response to a determination that an image associated with the current location exists in the memory system.

2. The mobile electronic device of claim 1, wherein location comprises current longitude and latitude information of the mobile electronic device.

3. The mobile electronic device of claim 1, wherein the navigation device is an assisted global position system (A-GPS) device or a GPS ONE device.

4. The mobile electronic device of claim 1, wherein the mobile electronic device is selected from the group consisting of a mobile phone, a personal digital assistant (PDA), a handheld game player, and a digital camera.

5. The mobile electronic device of claim 1, wherein the memory system is selected from the group consisting of a smart media card (SMC), a secure digital card (SDC), a compact flash card (CFC), a multi media card (MMC), a memory system stick (MS), an extreme digital card (XDC), and a trans flash card (TFC).

6. A method for changing the display background of a mobile electronic device, the mobile electronic device comprises a camera device operable to capture one or more images and store the one or more images in a memory system, and a near field communication (NFC) device operable to receive one or more images to the mobile electronic device from other electronic devices, the method comprising:
 obtaining a current location of the mobile electronic device from a navigation device;
 seeking an image associated with the current location of the mobile electronic device in the memory system, in response to a determination that the current location of the mobile electronic device does not match a location associated with a current display background displayed on a display device of the mobile electronic device; and
 replacing the current display background with the image associated with the current location, in response to a determination that the image associated with the current location exists in the memory system.

7. The method of claim 6, wherein location comprises current longitude and latitude information of the mobile electronic device.

8. The method of claim 6, wherein the navigation device is an assisted global position system (A-GPS) device or a GPS ONE device.

9. The method of claim 6, wherein the mobile electronic device is selected from the group consisting of a mobile phone, a personal digital assistant (PDA), a handheld game player, and a digital camera.

10. The method of claim 6, wherein the memory system is selected from the group consisting of a smart media card (SMC), a secure digital card (SDC), a compact flash card (CFC), a multi media card (MMC), a memory system stick (MS), an extreme digital card (XDC), and a trans flash card (TFC).

11. A storage medium having stored thereon instructions that, when executed by a mobile electronic device, the mobile electronic device comprises a camera device operable to capture one or more images and store the one or more images in a memory system, and a near field communication (NFC) device operable to receive one or more images to the mobile electronic device from other electronic devices, cause the mobile electronic device to perform a method for changing the display background of an electronic device, the method comprising:

obtaining a current location of the mobile electronic device from a navigation device;

seeking an image associated with the current location of the mobile electronic device in the memory system, in response to a determination that the current location of the mobile electronic device does not match a location associated with a current display background displayed on a display device of the mobile electronic device; and replacing the current display background with the image associated with the current location, in response to a determination that an image associated with the current location exists in the memory system.

12. The medium of claim 11, wherein location comprises current longitude and latitude information of the mobile electronic device.

13. The medium of claim 11, wherein the navigation device is an assisted global position system (A-GPS) device or a GPS ONE device.

14. The medium of claim 11, wherein the mobile electronic device is selected from the group consisting of a mobile phone, a personal digital assistant (PDA), a handheld game player, and a digital camera.

* * * * *